US012306116B1

(12) United States Patent
Wayne

(10) Patent No.: US 12,306,116 B1
(45) Date of Patent: May 20, 2025

(54) DUAL-PURPOSE SYSTEM FOR COLLECTIBLE CARD AUTHENTICATION, IDENTIFICATION, AND GRADING AND ANTI-SCANNING PROTECTION

(71) Applicant: Aharon N. Wayne, Southfield, MI (US)

(72) Inventor: Aharon N. Wayne, Southfield, MI (US)

(*) Notice: Subject to any disclaimer, the term of this patent is extended or adjusted under 35 U.S.C. 154(b) by 0 days.

(21) Appl. No.: 18/933,660

(22) Filed: Oct. 31, 2024

Related U.S. Application Data

(60) Provisional application No. 63/679,171, filed on Aug. 5, 2024, provisional application No. 63/652,131, filed on May 27, 2024.

(51) Int. Cl.
*G01N 23/046* (2018.01)
*G01N 23/083* (2018.01)
(Continued)

(52) U.S. Cl.
CPC ......... *G01N 23/046* (2013.01); *G01N 23/083* (2013.01); *G06T 3/06* (2024.01); *G06T 7/0002* (2013.01); *G06V 20/95* (2022.01); *G06V 30/30* (2022.01); *G01N 2223/401* (2013.01); *G06T 2200/04* (2013.01); *G06T 2207/10081* (2013.01)

(58) Field of Classification Search
CPC ............... G01N 23/046; G01N 23/083; G01N 2223/401; G06T 3/06; G06T 7/0002; G06T 2200/04; G06T 2207/10081; G06V 20/95; G06V 30/30
See application file for complete search history.

(56) References Cited

U.S. PATENT DOCUMENTS 10,459,931 B2   10/2019   Kass et al.
11,215,731 B2    1/2022   Burger
(Continued)

FOREIGN PATENT DOCUMENTS

JP   7251712 B1        4/2023
WO   2011110973 A2     9/2011
WO   2023095586 A1     6/2023

OTHER PUBLICATIONS

Hain, M. et al., "Use of X-ray microtomography and radiography in cultural heritage testing", 2017, 11th International Conference on Measurement, Smolenice, Slovakia, 2017, pp. 119-122, doi: 10.23919/MEASUREMENT.2017.7983550.

*Primary Examiner* — Courtney D Thomas
(74) *Attorney, Agent, or Firm* — Jacob M. Ward; Ward Law Office LLC

(57) ABSTRACT

This present invention provides systems for non-invasive identification and anti-identification of collectibles, such as cards, within sealed packages. A first system utilizes X-ray scanning and advanced image processing to identify package contents, while a second system incorporates artifact-inducing materials, radiation detection mechanisms, and motion-inducing components to militate against unauthorized scanning. The first system captures high-resolution images, applies virtual flattening and contrast enhancement techniques, and can use machine learning for accurate identification of package contents. The anti-identification system employs materials that disrupt scans, detects radiation exposure, and allows card movement during scanning to obscure results.

20 Claims, 15 Drawing Sheets

(51) Int. Cl.
*G06T 3/06* (2024.01)
*G06T 7/00* (2017.01)
*G06V 20/00* (2022.01)
*G06V 30/30* (2022.01)

(56) References Cited

U.S. PATENT DOCUMENTS

| | | |
|---|---|---|
| 2014/0119511 A1 | 5/2014 | Ward et al. |
| 2020/0057769 A1 | 2/2020 | Kass et al. |
| 2021/0158274 A1* | 5/2021 | Patchen ................ G06F 18/24 |
| 2022/0358806 A1 | 11/2022 | Cao et al. |

* cited by examiner

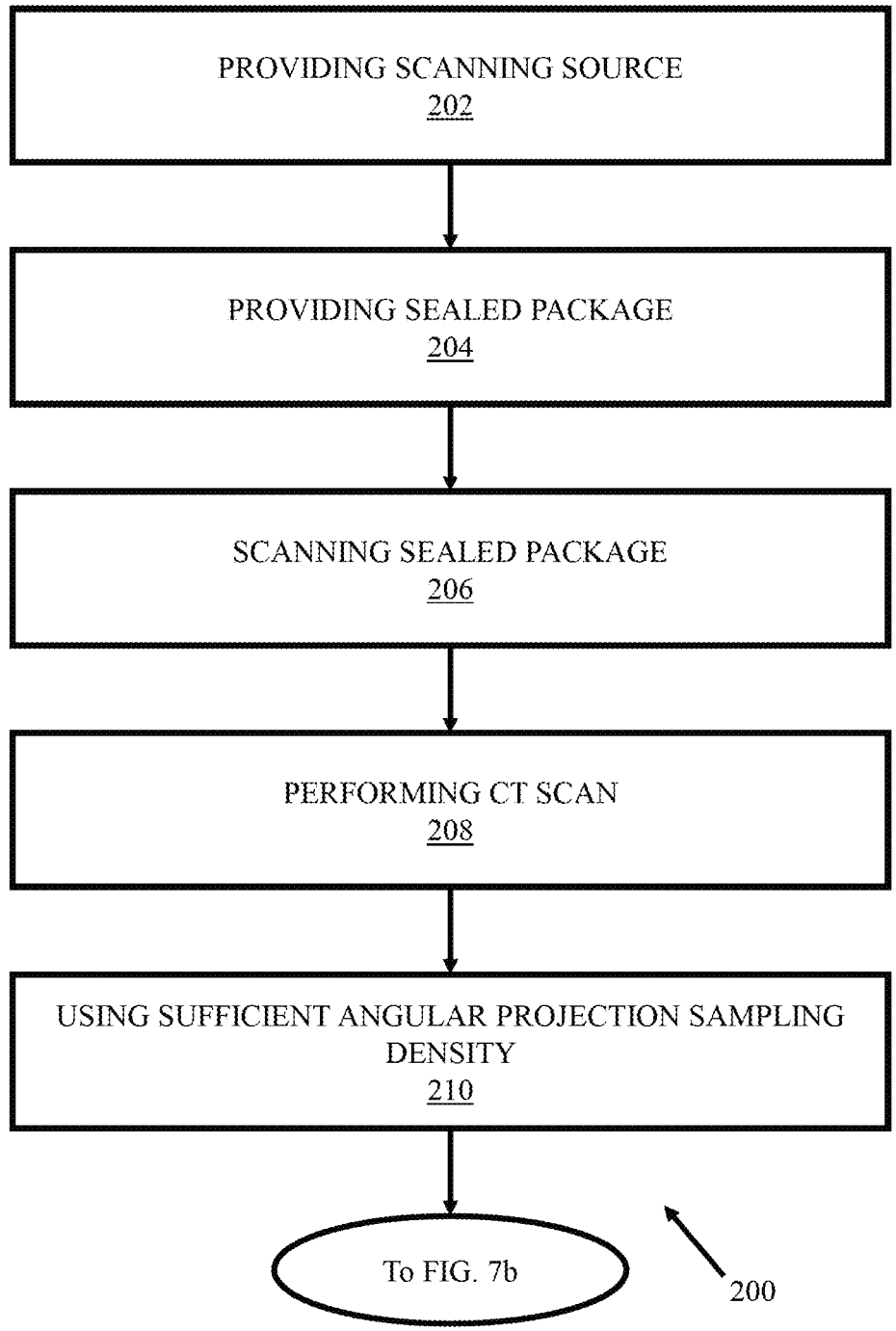

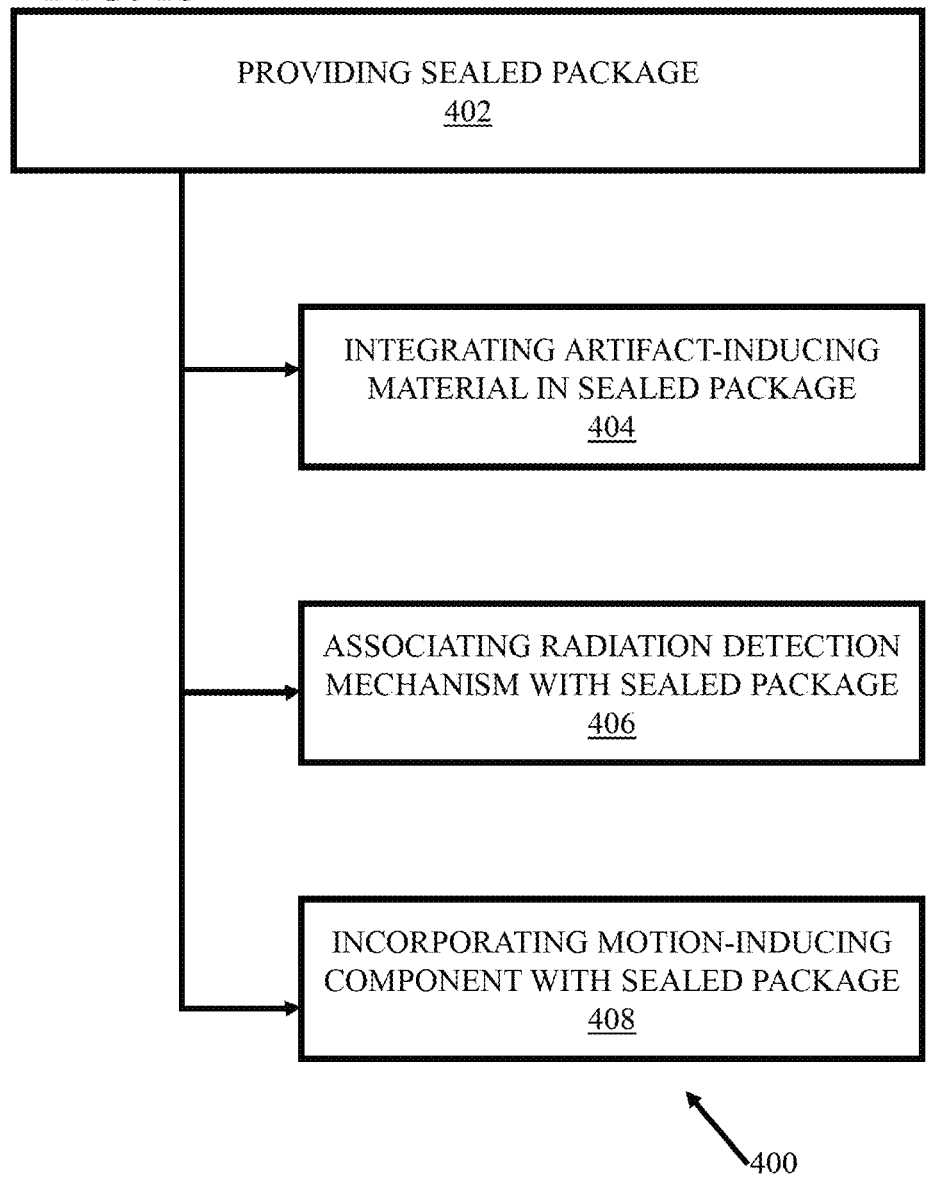

DUAL-PURPOSE SYSTEM FOR COLLECTIBLE CARD AUTHENTICATION, IDENTIFICATION, AND GRADING AND ANTI-SCANNING PROTECTION

CROSS-REFERENCE TO RELATED APPLICATIONS

This application claims the benefit of U.S. Provisional Application 63/679,171, filed on Aug. 5, 2024 and U.S. Provisional Application No. 73/652,131, filed on May 27, 2024. The entire disclosures of the above applications are incorporated herein by reference.

FIELD

The present technology relates to methods and systems for non-invasive identification, authentication, and grading of collectible trading cards within sealed packages, as well as protective measures to militate against unauthorized examination of such packages, using advanced imaging.

INTRODUCTION

This section provides background information related to the present disclosure which is not necessarily prior art.

The collectible trading card market has experienced significant growth and popularity in recent years, with rare and valuable cards becoming highly sought-after items for collectors and investors alike. This surge in interest has led to an increased demand for sealed card packs and boxes, which are often considered more valuable due to the potential of containing rare or high-value cards. However, the growing market has also given rise to several challenges and concerns within the industry. One of the primary issues is the difficulty in authenticating and verifying the contents of sealed packs without compromising their integrity.

Methods of authentication, such as visual inspection or weighing, have proven to be inadequate in ensuring the authenticity and value of sealed packages. The advent of advanced imaging technologies provides new ways for non-invasively examining the contents of sealed packages. These techniques have the potential to reveal detailed information about the cards within a pack, including their identity, condition, and even manufacturing variations that may affect their value. While this technology offers benefits in terms of transparency and trust in the market, it also poses significant risks to the integrity and value of sealed collectibles.

The ability to non-invasively identify high-value cards within sealed packs has led to concerns about potential exploitation and manipulation of the market. Unscrupulous individuals could potentially use these scanning techniques to cherry-pick packs containing valuable cards, leaving less-desirable packs for unsuspecting buyers. This practice could undermine the fundamental appeal of sealed products and erode trust in the collectible card market.

Accordingly, there is a continuing need for effective methods and systems to protect the integrity of sealed collectible trading card packages against unauthorized examination and identification. Desirably, such methods would discourage the use of advanced imaging techniques to reveal pack contents while maintaining the mystery and excitement that collectors associate with unopened products.

SUMMARY

In concordance with the instant disclosure, a continuing need for effective methods and systems to protect the integrity of sealed collectible trading card packages against unauthorized examination and identification, has surprisingly been discovered.

The present technology includes articles of manufacture, systems, and processes that relate to protecting the integrity of sealed collectible trading card packages by discouraging non-invasive identification using X-ray and/or computed tomography (CT) techniques.

In certain embodiments, a system for non-invasive identification of a card within a sealed package is provided. The system can include a scanning source and a computing device. The scanning source can include an emitter and a detector. The emitter can be configured to emit an electromagnetic radiation, and the detector can be configured to capture a scan of an internal content of the sealed package containing the card. The computing device can be in communication with the scanning source and can be configured to receive the scan captured by the detector, analyze the scan to provide a layer image of the card representing a card within the sealed package, and apply a virtual flattening technique to the layer image to provide a virtually flattened image that improves a visualization of the card within the sealed package. The computing device can further be configured to apply a contrast enhancement to the virtually flattened image to provide an enhanced image that improves an identification of an image and a text of the card within the sealed package and determine an identity of the card based on the image and the text of the card within the sealed package. It should be appreciated that the system further permits for non-invasive authentication and grading of the card within the sealed package.

In certain embodiments, the present disclosure provides a method for non-invasive identification of a card within a sealed package with a scanning source. The method can include providing the scanning source and providing the sealed package having a card within. The method can further include scanning the sealed card package to capture a scan of an internal content of the sealed package. The captured scan can be analyzed to determine a presence of and an identity of the card within the sealed package whereby the identity of the card is determined. It should be appreciated that the method further permits for non-invasive authentication and grading of the card within the sealed package.

In certain embodiments, a system for militating against a non-invasive identification of a collectible within sealed packages is provided. The system can include a sealed package and a motion-inducing component. The sealed package can contain one or more cards and at least one of an artifact-inducing material and a radiation detection mechanism. The artifact-inducing material can be integrated with the sealed package and can be configured to generate an artifact in a scan of the sealed package. The radiation detection mechanism can be configured to indicate exposure to radiation above a predetermined threshold. The motion-inducing component within the sealed package can be configured to allow a movement of the one or more cards during scanning.

In certain embodiments, the present disclosure provides a method for discouraging identification of a card within a sealed package. The method can include a step providing a sealed package including one or more cards. The method can include at least one of a step of integrating an artifact-inducing material with the sealed package, a step of associating a radiation detection mechanism with the sealed package, and a step of incorporating a motion-inducing component within the sealed package.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 7B:
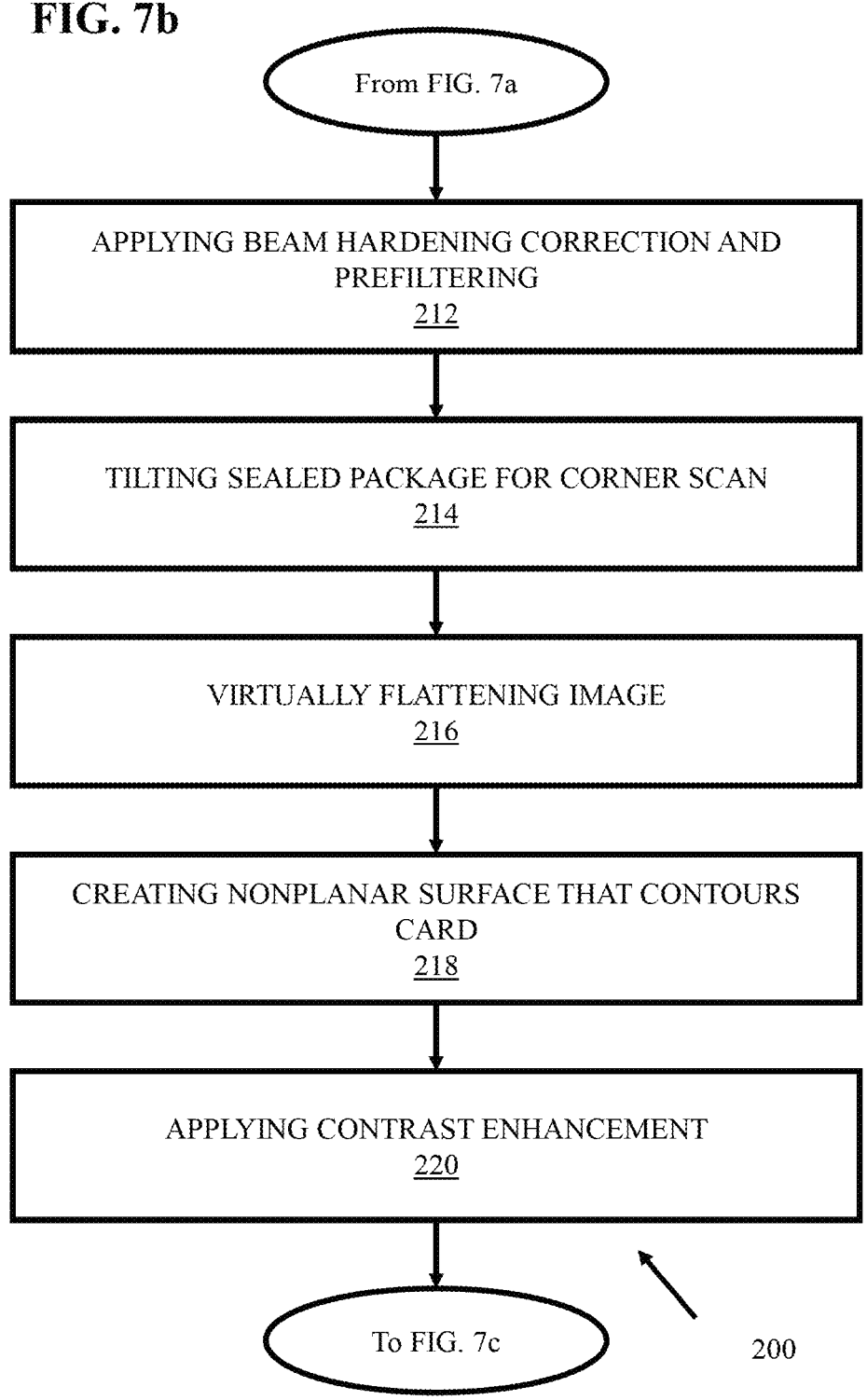
Figure 7C:
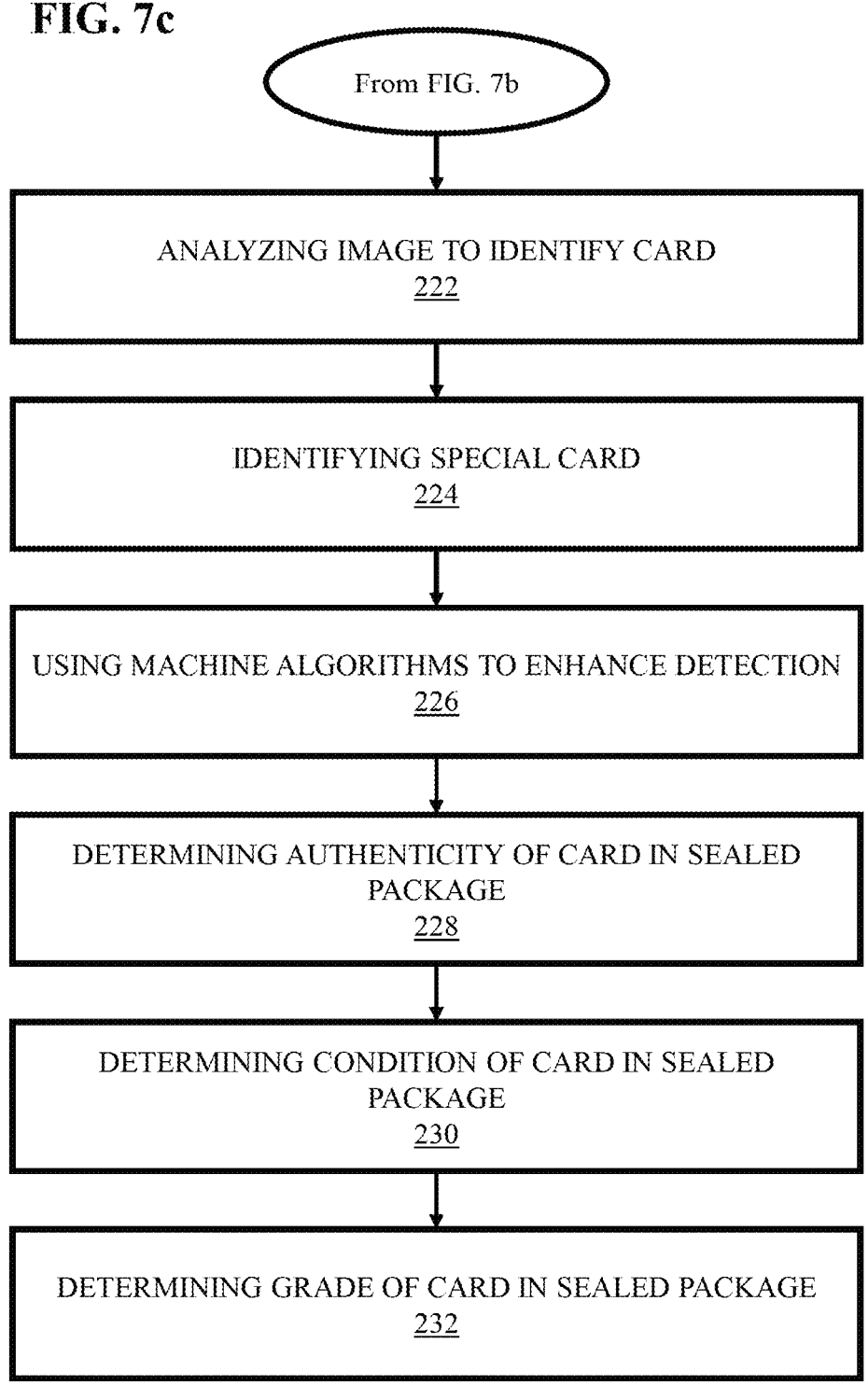
Figure 8:
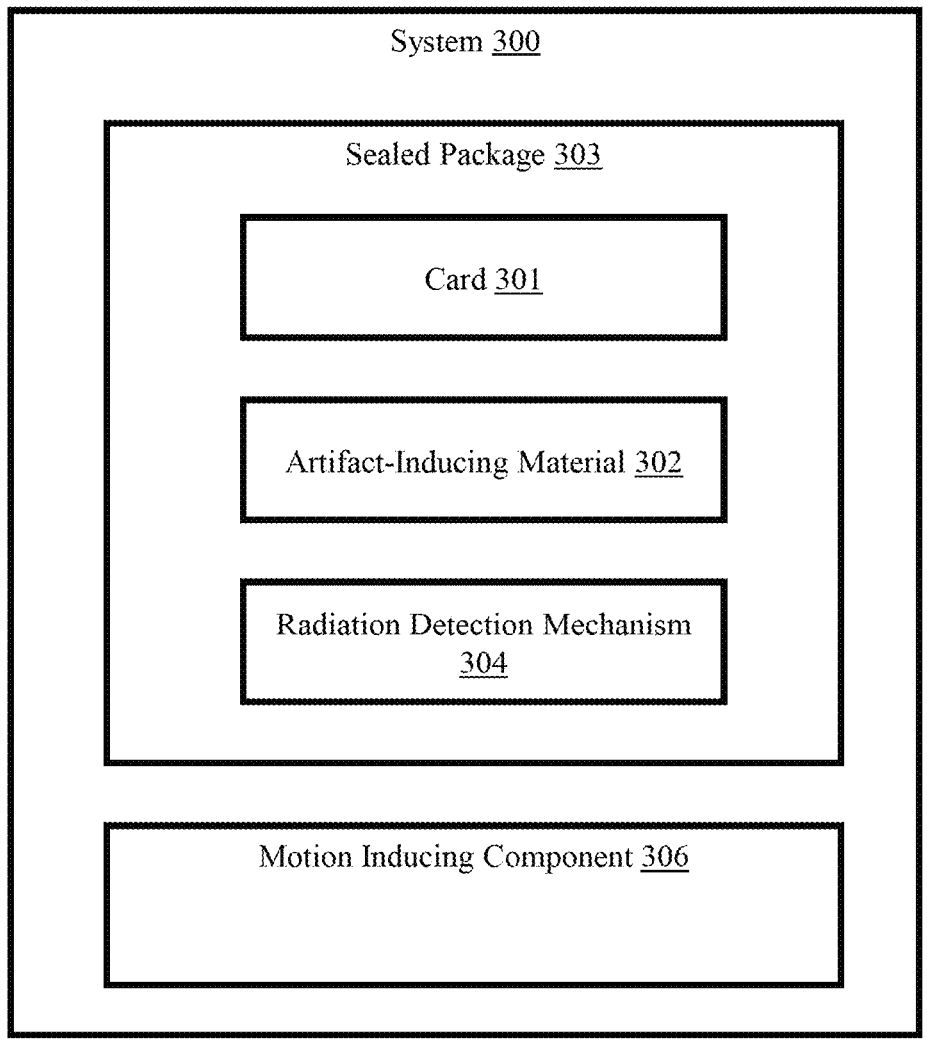
Figure 9A:
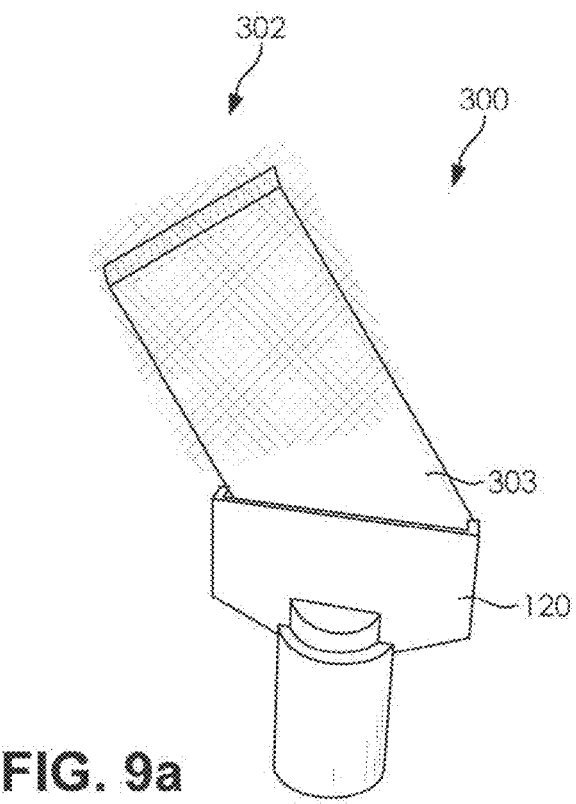
Figure 9B:
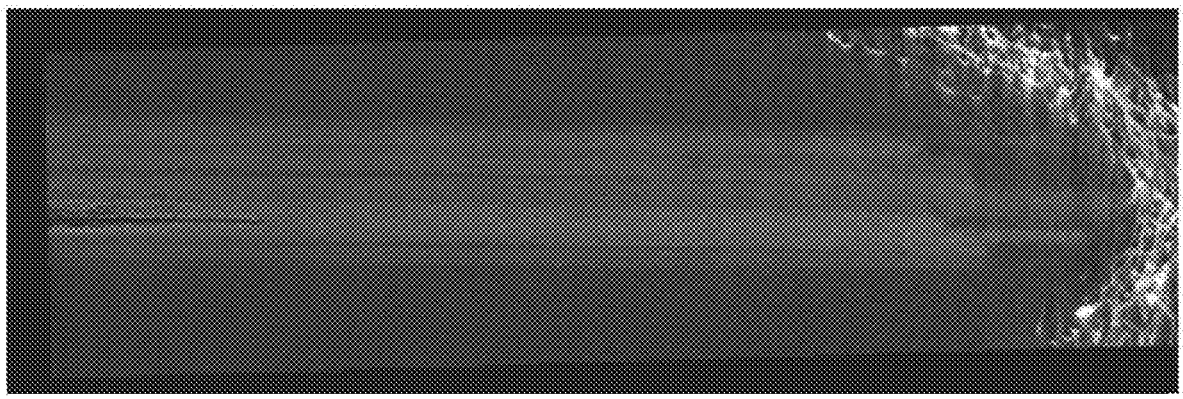
Figure 10A:
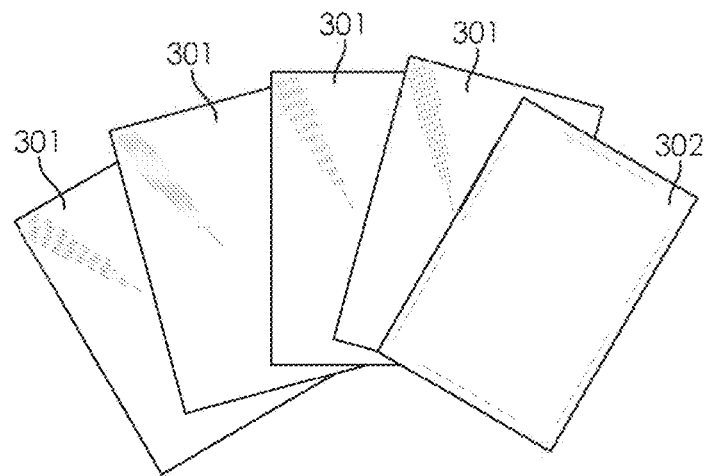
Figure 10B:
Figure 11A:
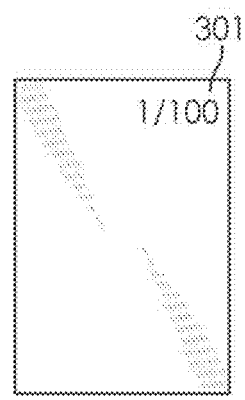
Figure 11B:
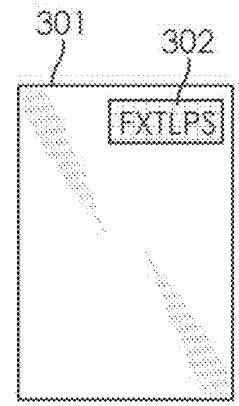
Figure 12:
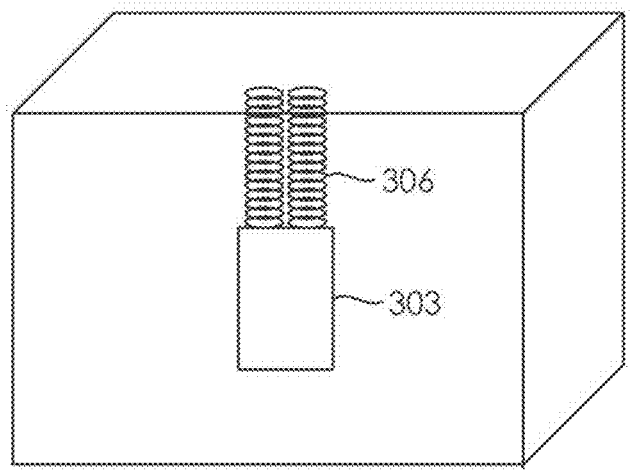

FIGS. 7a-7c provide a flowchart depicting a method for non-invasive identification of the card within the sealed package with the scanning source;

FIG. 8 is a schematic depicting a system for militating against a non-invasive identification of the card within the sealed package;

FIG. 9a is a front elevational view of the sealed package with an artifact-inducing material disposed on the sealed package, according to one embodiment;

FIG. 9b is an image from a scan of the sealed package and the artifact-inducing material demonstrating the disruption to the image caused by the artifact-inducing material, according to one embodiment;

FIG. 10a is a front elevational view of the cards present in sealed package with an artifact-inducing material disposed within the sealed package, according to one embodiment;

FIG. 10b is an image from a scan of the sealed package and the artifact-inducing material demonstrating the disruption to the image caused by the artifact-inducing material, according to one embodiment;

FIG. 11a is a front elevational view of the card with serialization;

FIG. 11b is a front elevational view of the card with serialization including an artifact-inducing component over the serialization;

FIG. 12 is an environmental view of a motion-inducing component including a suspended sealed package within a box; and FIG. 13 is a flowchart depicting a method for discouraging identification of the card within the sealed package.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology improves upon existing methods for non-invasive identification of collectible trading cards within sealed packages using X-ray and computed tomography (CT) techniques, while also introducing countermeasures to discourage such identification attempts. Included are a system 100 and method 200 for non-invasive identification of collectible trading cards within sealed packages using X-ray and computed tomography (CT) techniques, shown generally in FIGS. 1-7, as well as a system 300 and method 400 for countermeasures to militate against non-invasive identification, shown generally in FIGS. 8-13.

As used herein, the term "card" or "collectible" refers to any item that is valued and sought after by collectors due to its rarity, uniqueness, or aesthetic appeal. Non-limiting examples of types of collectibles can include a wide range of objects, such as coins, stamps, trading cards, vintage toys, art, and memorabilia. It should be appreciated that the systems and methods of the present disclosure can be applied to any sort of collectible and are not limited to trading cards.

As used herein, the term "sealed package" refers to trading card packs, boxes, tin, blister, or other products that have not been opened and remain in their original packaging. This includes any type of trading card product or collectible card product that is still factory-sealed, ensuring that the contents are untouched. Identifiable characteristics of sealed trading cards include their original packaging, which can consist of booster packs, boxes, or special collections, as well as the fact that the cards inside have not been handled, helping to preserve their condition and market value. Non-limiting examples of types of sealed packages include such products related to the tradenames MAGIC: THE GATHERING®, POKEMON®, YU-GI-OH!®, DRAGON BALL Z®, FLESH AND BLOOD®, DIGIMON®, FINAL FANTASY®, and TOPPS® collectible trading cards.

As used herein, the term "special card" or "predetermined card" refers to a unique or rare version of a standard card, often featuring distinct characteristics such as enhanced artwork, alternative designs, holographic finishes, or special textures. Non-limiting examples include shiny POKEMON® cards, foil cards, or cards with unique illustrations. Further examples include a card having a total issue number less than average for cards of that type, including a card that may have a unique or very limited issue number (e.g., 10 instances compared to every 100 instances of other cards). Such cards can be known as serialized cards and can have a printed number on them that affects the value of the card.

Figure 1:
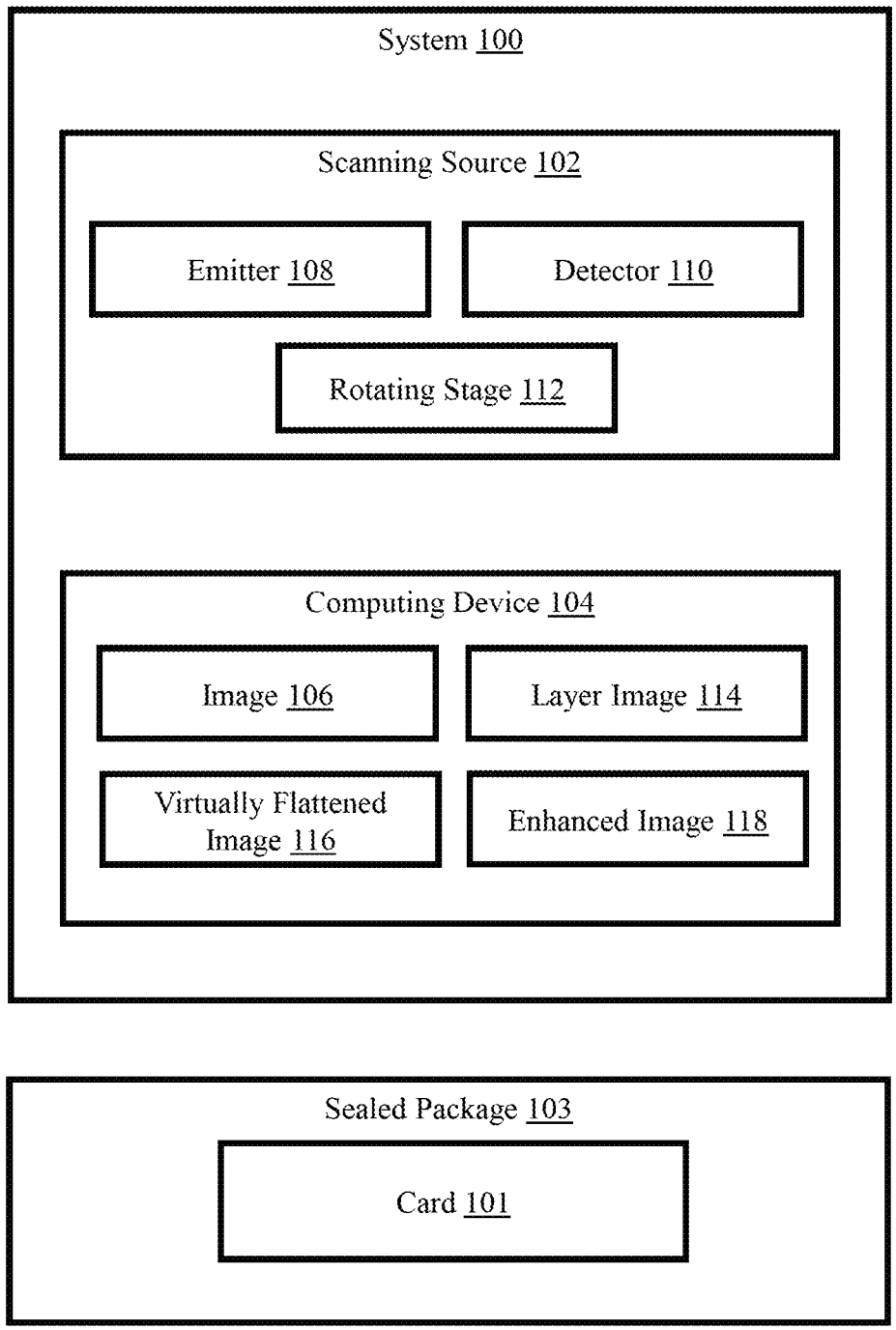
FIG. 1 is a schematic depicting a system for non-invasive identification of a card within a sealed package.
Figure 2A:
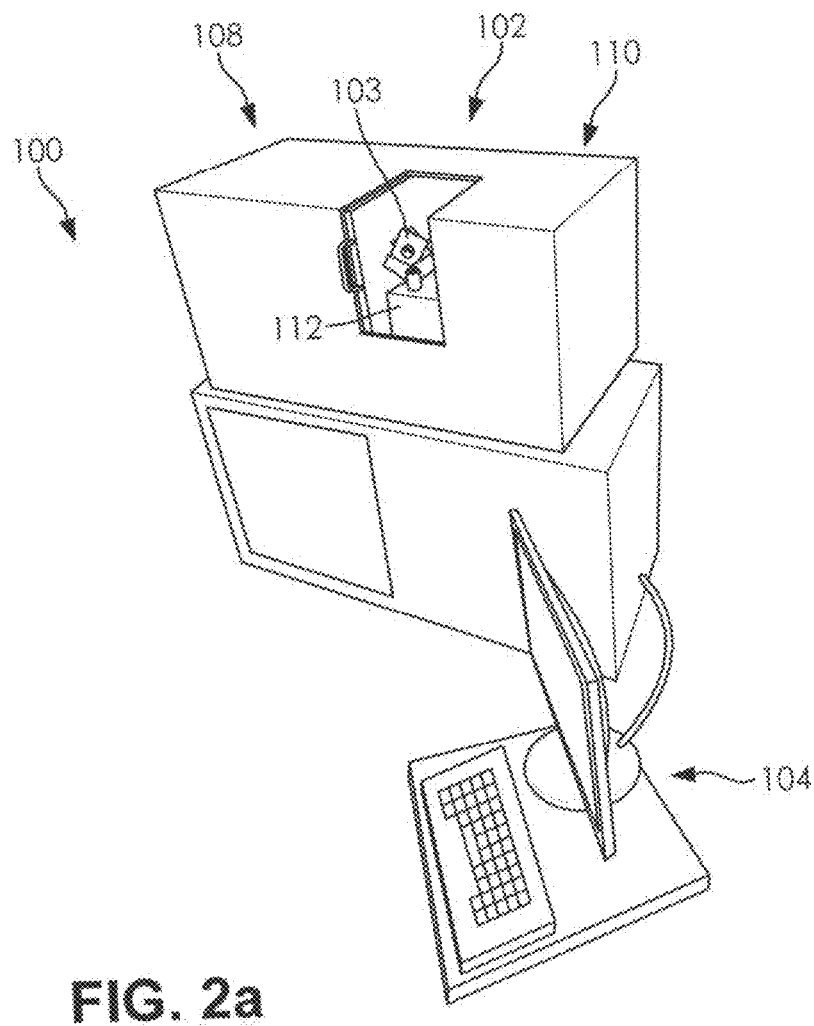
FIG. 2a is an environmental perspective view of scanning source and a computing device scanning the sealed package.
Figure 2B:
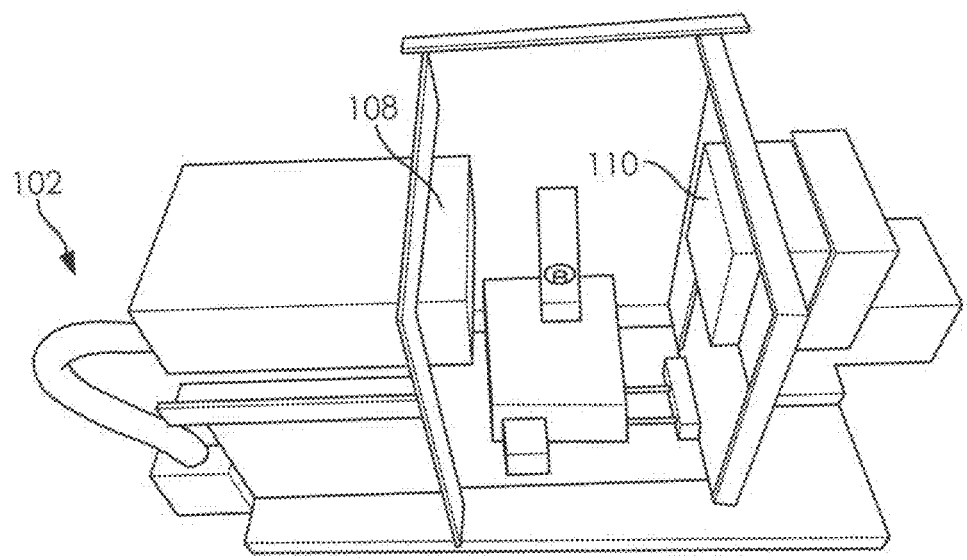
FIG. 2b is a cutaway perspective view of the scanning source and a computing device.

With reference to FIGS. 1-2b, the system 100 for a non-invasive identification of a card 101 within a sealed package 103 containing the card 101 can include a scanning source 102 and a computing device 104. The scanning source 102 and the computing device 104 can together produce a scan including multiple images 106 to be analyzed for card 101 identification, authentication, and grading. The scanning source 102 can include an emitter 108 and a detector 110.

As an example, the scanning source 102 can include a computer tomography (CT) scanner and the computing device 104 can be further configured to perform a CT scan using the CT scanner to obtain one or more three-dimensional images 106 of the sealed package 103. In certain embodiments, the scanning source 102 can be a micro-CT. Micro-CT can provide high-resolution, 3D images of small objects, often at the micron or sub-micron scale. During micro-CT, the sealed package 103 to be imaged can be placed on a rotating stage 112 within the scanning source 102, allowing control of the position and the orientation of the sealed package 103. As the sealed package 103 rotates about an axis, the emitter 108 emits a beam that passes through the sealed package 103, while the detector 110 can measure the intensity of the X-rays that are modulated by materials within the sealed package 103. This creates a series of 2D projection images 106 for each angle of rotation which together form a scan of the sealed package 103.

The sealed package 103 can be rotated in small increments, capturing multiple 2D images 106 at various positions which together form a scan. The collected images 106 can be processed by the computing device 104. The rotating stage 112 can be controlled by the computing device 104 such that the computing device 104 can manipulate the increment of the rotation to allow for the optimum number of projections to occur for imaging. The rotation can occur in predefined incremental steps, allowing for images 106 to be taken at desirable angles for thorough reconstruction by the computing device 104. A skilled artisan can select a suitable number of scans within the scope of the present disclosure.

The emitter 108 can be configured to emit electromagnetic radiation. The emitter 108 can produce monochromatic or a polychromatic X-ray at a voltage optimized to enhance contrast between different components within the sealed package 103. As an example, low-energy X-rays can be more useful for enhancing the contrast between individual lower attenuating components (such as cardstock, plastic, or air) and between lower attenuating components and higher attenuating components (such as between cardstock/plastic and metallic ink).

Figure 4:
FIG. 4 is a resolution image demonstrating visualization of internal pack contents with sufficient geometry to identify, authenticate, and grade holographic Gengar POKEMON® card from within a sealed package.

With reference to FIGS. 2a-2b, the detector 110 can be configured to capture the image 106 of an internal content of the sealed package 103 containing the card 101. The detector 110 can work in conjunction with the emitter 108 to provide detailed visualization of the cards 101 within the sealed package 103. The capability of the detector 110 to capture high-resolution images allows for the subsequent analysis and identification process. As one example, FIG. 4 depicts a visualization of a card 101 within the sealed package 103 with sufficient geometry to identify and grade the card: a holographic Gengar from within a sealed, first edition Fossil POKEMON® pack.

With further reference to FIGS. 2a-2b, the computing device 104 can be in communication with the scanning source 102. The computing device 104 can be configured to receive the image 106 captured by the detector 110 and analyze the image 106 to provide a layer image 114 of the card representing the 103 card within the sealed package 103. The computing device 104 can further be configured to apply a virtual flattening technique to the layer image 114 to provide a virtually flattened image 116 that improves a visualization of the card 101 within the sealed package 103. The computing device 104 can be configured to apply a contrast enhancement to the virtually flattened image 116 to provide an enhanced image 118 that improves an identification of an image and text of the card 101 within the sealed package 103, and, based on the image and/or text of the card 101, the computing device 104 can be configured to determine an identity of the card 101.

It should be appreciated that the computing device 104 can be configured to identify a presence of a special card 101 by detecting a physical texture, a metallic or dense ink, a foil or a plastic backing, or other characteristic that differentiates the card based upon the image collected. To maximize the effectiveness of the scanning source 102 and provide the computing device 104 with an image of high resolution, several parameters can be considered. These parameters can include the angular projection sampling density, the view angle, the signal-to-noise ratio (SNR), image averaging, exposure time, and aspect ratio. For example, sufficient angular projection sampling density can be used to promote accurate identification and analysis of the card 101, with particular emphasis on capturing long view angles. It should be appreciated that angular projection sampling density refers to the number and distribution of X-ray projections taken during a computed tomography (CT) scan. Sufficient angular projection sampling density allows for successful imaging of the sealed package 103 without advanced or machine algorithms.

Figure 3A:
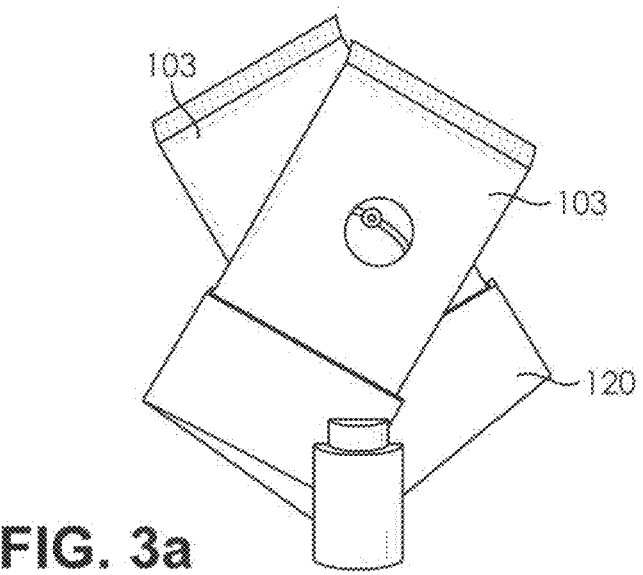
FIG. 3a is a front elevational view of the sealed packed disposed in a tilting mechanism.
Figure 3B:
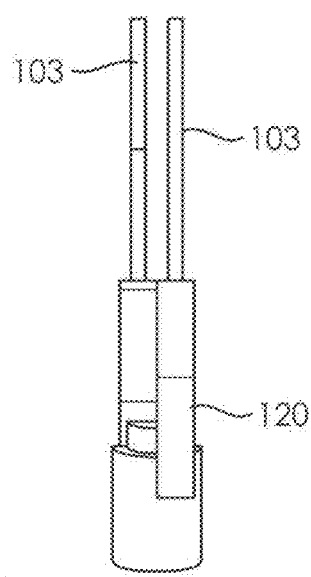
FIG. 3b is a side elevational view of the tilting mechanism with the sealed package.
Figure 3C:
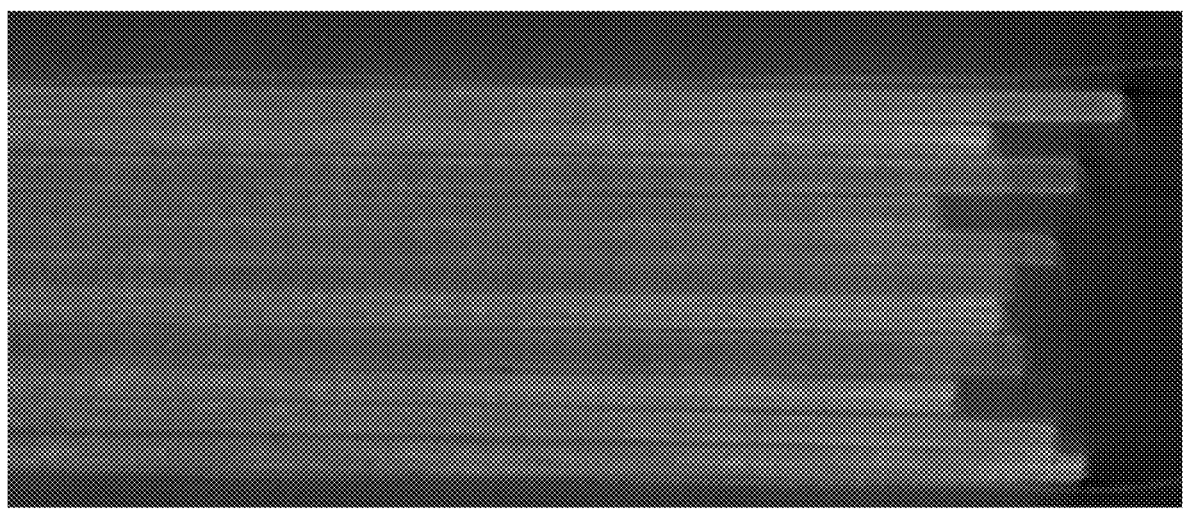
FIG. 3c is a resolution image of the sealed package along a long angle view demonstrating multiple cards within the sealed package.

The density of the projections, as well as how the sealed package 103 is oriented relative to the emitter 108 and the detector 110, can allow for higher resolution images. This is because cards 101 and sealed packages 103 have a high aspect ratio, which is considered problematic for CT scanning techniques. Desirably, positions that provide long view angles of the cards 101 and sealed package 103, as shown in FIGS. 3b-3c, are the positions that result in the maximum path length for X-rays between the emitter 108 and the detector 110. To achieve a long view angle of the cards 101 within the sealed package 103, a tilting mechanism 120, as shown in FIGS. 3a-3b may be utilized. An example of the image 106 of the sealed package 103 along the long view angle is shown in FIG. 3c. Long view angles can provide a higher quantity of image 106 needed for detecting the presence and identity of special cards when using the system 100. Long view angles can improve the ability to analyze the cards 101 by maximizing X-ray attenuation, which can assist in visualizing subtle differences in card 101 composition. By using long view angles, special features like foil backings, metallic inks, or textured surfaces that differentiate valuable cards can be more easily identified during analyzing. Additionally, better visualization of the edge of the card, which can reveal important details about card condition and manufacturing variations, is more easily achieved by using long view angles during scanning. Similarly, laminography techniques, which image at oblique angles by tilting the object relative to the emitter 108 and detector 110, can be employed to achieve high-resolution sectional images of the cards 101. Laminography can be effective in resolving layered structures within high aspect ratio objects and can provide comparable benefits for analyzing card features and surface variations.

It should be appreciated that a high projection density can be required for adequate sampling at the long view angles. The high density of projections, particularly at long view angles, allows for more accurate reconstruction of the features of the card 101 and better identification of special cards within the sealed package. It is important to note that high angular projection sampling density can be balanced with other techniques. For example, instead of high projection density over a complete 360-degree scan, high projection density over a few degrees of arc corresponding to the long view of the card can be sufficient. A hybrid approach of increasing X-ray projection density over the long view while still obtaining some projections over the whole rotation can also provide a good balance between image quality and scanning efficiency.

Another parameter that can further maximize the effectiveness of the scanning source 102 is the signal-to-noise ratio (SNR). Image averaging and sufficient exposure time can be employed to increase the SNR in the captured images, therefore resulting in an increased effectiveness. At low X-ray energies, which can be used to enhance contrast between different card materials, noise can be more present in individual projection images due to reduced photon flux, especially through long-projection angles of the sample. To address this issue and improve image quality, image averaging and increasing exposure time can be implemented. With respect to image averaging, by taking multiple images of the same area and averaging them together, random noise in the images tends to cancel out while the consistent signal, the actual image of the cards 101, is reinforced, effectively reducing the noise level in the final image. Additionally, increasing the exposure time allows more X-ray photons to reach the detector, which inherently improves the SNR. A longer exposure time means more signal can be collected relative to the constant background noise, which can result in clearer, more detailed images. Both image averaging and increasing exposure time can assist in overcoming the challenging nature of imaging the cards 101 within the sealed package 103. The cards 101 can often be made of materials with similar densities, and special features like foil or metallic inks can sometimes only provide subtle differences in X-ray attenuation.

Yet another parameter that can be optimized to increase the effectiveness of the system 100 is the aspect ratio of the sealed package 103. The aspect ratio can be improved by utilizing the tilting mechanism 120, commonly known as a corner scan, as shown in FIGS. 3*a*-3*b*. Tilting the sealed package 103 in such a way that the path length of the X-rays through the scaled package 103 is minimized while simultaneously maximizing the SNR during scanning. Utilizing the corner scan technique with respect to cards 101 is particularly useful based on the geometry of the card 101. The card 101 can have a high aspect ratio because cards 101 can be significantly longer in one dimension, such as the height of the card 101, compared to another dimension, such as the width or thickness of the card 101. A high aspect ratio can present challenges when imaging because the most relevant information for determining the identity of a card exists only in a thin coating on the surface of the card.

By tilting the sealed package 103 containing the card 101, the system 100 can achieve a more favorable orientation that aids in identifying the card 101 by minimizing path length, maximizing the SNR, and improving resolution. With respect to minimizing path length, by tilting the sealed package 103, the electromagnetic radiation emitted by the scanning source 102 can pass through less material, militating against attenuation and scatter. The tilted orientation also allows for better signal collection relative to noise, resulting in clearer, more detailed images. Additionally, the corner scan technique can help achieve sufficient resolution or natural voxel size, which can be important for identifying specific special cards and their characteristics. It is important to note that for the sake of identifying a card or determining its authenticity, it is not always necessary to image the entire package.

The computing device 104 can be configured to apply beam hardening correction to reduce greyscale variation artifacts and improve image quality. Beam hardening can occur when X-rays are polychromatic, containing a spectrum of energies. As the X-ray beam passes through an object, lower-energy X-rays can be more readily absorbed than higher-energy X-rays, causing the beam to become "harder" as it passes through the object. This effect can lead to artifacts in the reconstructed images, such as cupping artifacts and streaks, which can obscure important details.

Beam hardening correction, however, can be applied to improve image quality and accuracy when scanning the sealed package 103. Additionally, prefiltering can be used in conjunction with beam hardening correction. Prefiltering can involve placing a filter material in front of the emitter 108 to remove lower-energy X-rays before they reach the sealed package 103, which can help reduce the severity of beam hardening effects. It should be appreciated that the computing device 104 can control the filter wheel and alternatively, the filter wheel can be moved manually by the user. As an example, beam hardening correction can include using a low voltage scanning source 102, utilizing sufficient angular projection sampling density, utilizing the tilting technique and maintaining sufficient resolution or natural voxel size.

It should be appreciated that cards 101 found in sealed packages 103 can be warped such that the card 101 is not perfectly flat. A perfectly flat scanning surface of the card 101 is desirable as it allows for improved visualization. The computing device 104 can be configured to create a non-planar surface that contours to the card and reproject nearest voxels onto a theoretically flat plane for visualization during virtual flattening. To virtual flattening the cards 101 the computing device 104 can first create a non-planar surface. The computing device 104 can generate a surface that follows the contours of the card 101 as it exists within the sealed package 103. The surface can account for any bending or warping of the card. Once the nonplanar surface is created, the system 100 can reproject the nearest voxels (3D pixels) from the curved surface onto a theoretically flat plane to essentially "unbend" the card 101 digitally, creating a flat representation for analyzing and visualizing. Advantageously, the virtual flattening technique allows for improved visualization, consistency, and preservation of small details on the card 101.

Figure 5A:
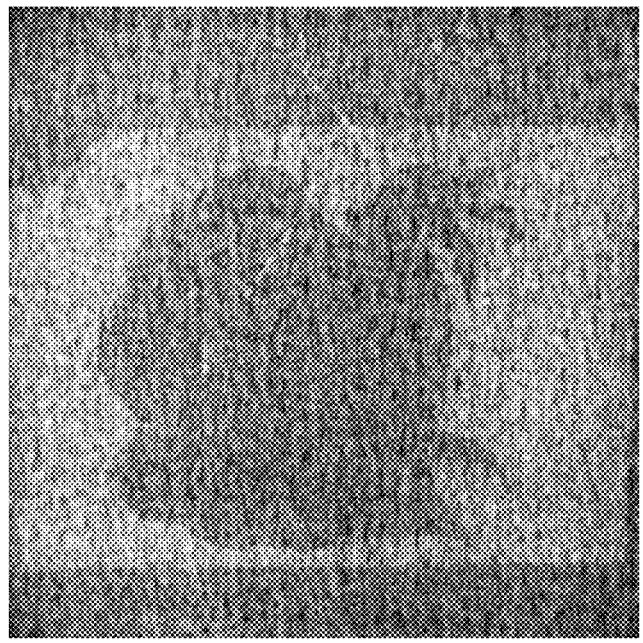
FIGS. 5a and 5b are a comparison demonstrating an image of a real Ninetales POKEMON® card, shown in FIG. 5a and an image of a counterfeit Ninetales POKEMON® card, shown in FIG. 5b.
Figure 5B:
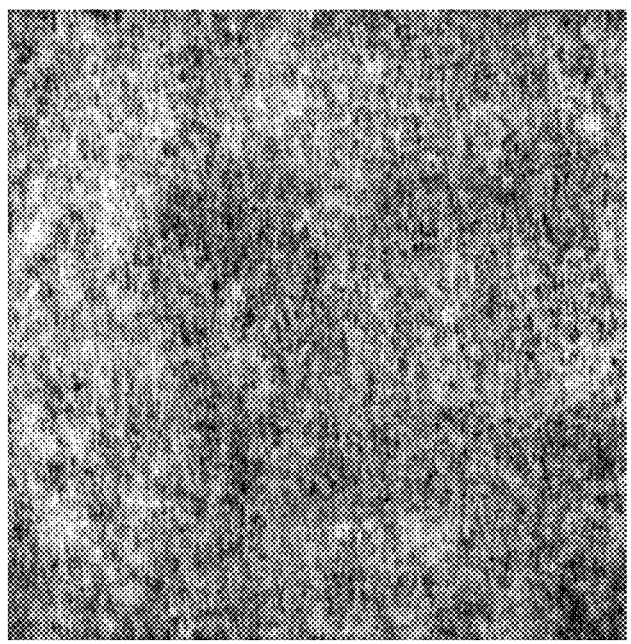

It should also be appreciated that the computing device 104 can be configured to authenticate the sealed package by detecting any evidence of tampering with the sealed package. The system 100 can detect tampering in several ways. The scanning and image processing techniques utilized by the computing device 104 can reveal any alterations to the structure of the sealed package 103 that can indicate tampering. For example, the presence of glue or other sealing materials that are not part of the original manufacturing process can be detected. The system 100 can also examine the integrity of the seal of the sealed package 103. For instance, if a pack is known to be sealed by the manufacturer using heat, the presence of any other sealing method would be a sign of potential tampering. By comparing the scanned package to known, untampered packages, the system 100 can identify any anomalies that might indicate tampering. The computing device 104 can also be used to authenticate the cards themselves, as legitimate and counterfeit cards can differ distinctly in x-rays, as shown in FIGS. 5*a*-5*b*.

It should be appreciated that the computing device 104 can be configured to determine a condition of the card and the sealed packaging based on a presence of physical damage. The high-resolution images 106 captured by the scanning source 102 can reveal physical imperfections such as fraying corners or scratches on the cards 101. The system 100 can also detect certain manufacturing variations that affect card 101 value.

The computing device 104 can further be configured to determine a grade of the card based on the condition of the card as determined by the computing device 104 as well as measuring conditions of value, such as centering. Centering refers to the positioning of the artwork on the face of the card 101 as well as design elements within the borders of the card 101. In the context of collectible trading cards, centering is an important factor in determining the condition and value of a card. For instance, with respect to older POKEMON® cards, card centering can be determined and measured via the computing device 104 because during manufacture of the POKEMON® card, the art work displaying the POKEMON® was printed onto card stock that already had a yellow border on it, and the overlap shows additional contrast to X-Rays. Because well-centered cards are generally more valuable in the collectible card market, it can be helpful for grading purposes to detect centering non-invasively.

Figure 6A:
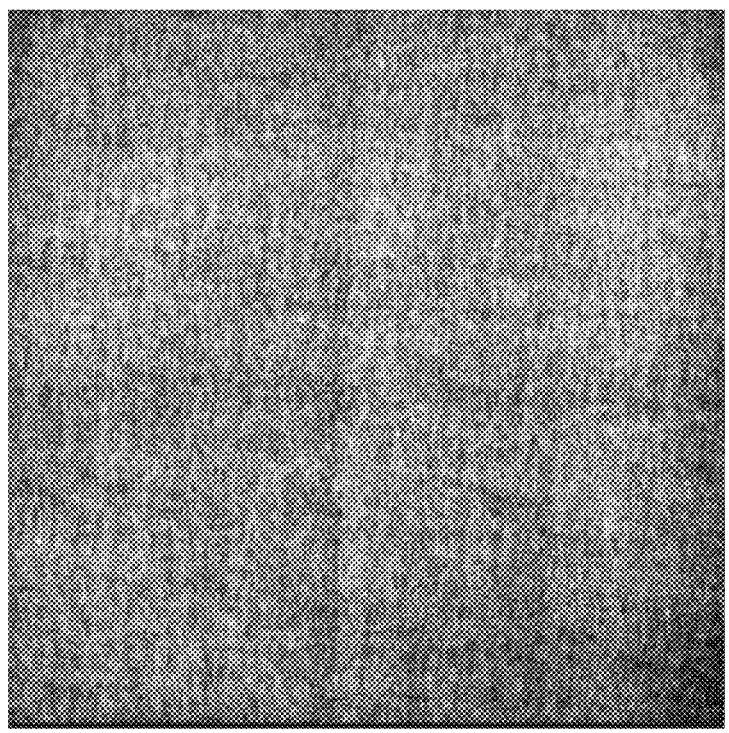
FIGS. 6a and 6b are a comparison demonstrating an image without denoising, shown in FIG. 6a and the resolution image with denoising, shown in FIG. 6b due to machine learning.
Figure 6B:
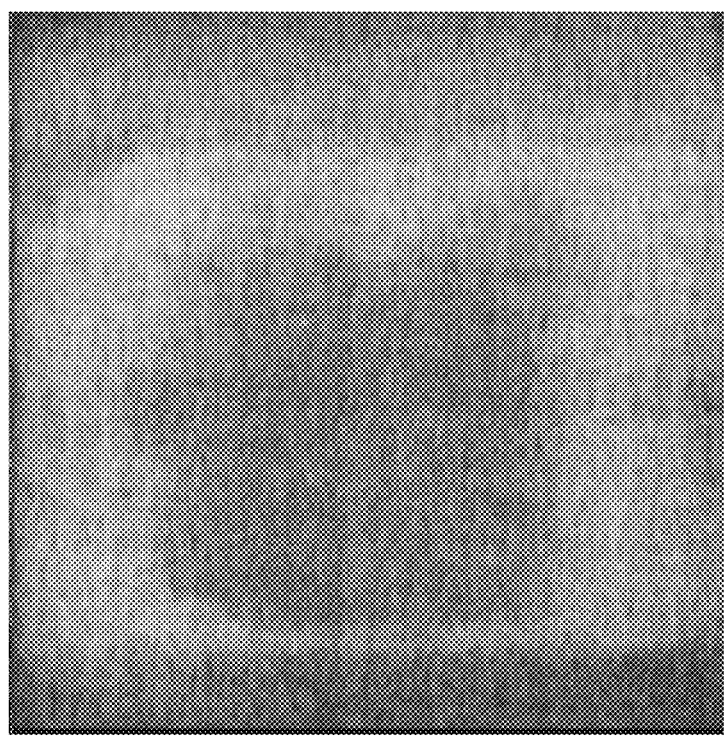

Upon gathering the image using the above-described optimized parameters, the computing device 104 can be configured to use machine learning algorithms, including random forest, unets, resnets, autoencoders and CNNs, to enhance detection accuracy and identify special cards based on their unique characteristics. Machine learning algorithms can be effective in this context for pattern recognition, allowing the computing device 104 to be trained to recognize subtle patterns and features that distinguish special cards 101. The adaptive learning capability of the algorithms means that as the system 100 encounters more cards, the computing device 104 can continuously improve detection and identification capabilities, becoming more accurate over time. For example, FIGS. 6a-6b depict the impact of machine learning denoising with the difference in an image with a low SNR, as shown in FIG. 6a, and a high SNR, as shown in FIG. 6b.

The computing device 104 can further perform measurements and make determinations on card 101 condition or grade, for instance, the presence of damage, scratches, manufacturing variations, and centering value. Centering determination can occur when the ink used to mark a border of the card 101 yields contrast in x-rays. Through a combination of identity, condition, and centering value, a virtual grade can occur without physically opening the sealed package 103.

The present disclosure further provides a method 200 for non-invasive identification of a card 101 within a sealed package 103 with a scanning source 102, as shown in FIGS. 7a-7c. In a step 202, the method 200 can include providing the scanning source 102 as described herein and a step 204 of providing the sealed package 103 having a card 101 within. The method 200 can include a step of scanning the sealed package 103 to capture the image 106 of an internal content of the sealed package in a step 206. In certain embodiments, the step 206 of scanning the sealed package 103 can further include a step 208 of performing a CT scan to obtain three-dimensional images of the cards 101 within the sealed package 103. The step 208 of performing the CT scan can also include a step 210 of using sufficient angular projection sampling density to ensure accurate identification and analysis of the trading cards, with particular emphasis on capturing long view angle, as described herein. Additionally, performing the CT scan in step 208 can also include a step 212 of applying beam hardening correction and prefiltering to reduce greyscale variation artifacts and improve image quality and a step 214 of tilting the sealed package for a corner scan to minimize path length and maximize signal-to-noise ratio during scanning.

The method 200 can further include a process of virtual flattening the image 106. In a step 216, the computing device 104 can apply a virtual flattening technique to improve a visualization of the captured image 106 of the cards 101 of the sealed package 103, whereby the virtually flattened image 116 is formed. The step 216 of applying the virtual flattening technique can also include a step 218 of creating a nonplanar surface that contours to the card and reprojecting nearest voxels onto a theoretically flat plane for visualization. The method 200 can include a step 220 of applying a contrast enhancement to the virtually flattened image 116.

In step 222, the image 106 can be analyzed to determine a presence of and an identity of the card 101 within the sealed package 103. It should be appreciated that the step 222 of analyzing the image 106 can further include a step 224 of identifying the presence of special cards by detecting physical texture, metallic or dense ink, foil or plastic backing, or other characteristics that differentiate them from lower-valued cards. It should be appreciated that the step 222 of analyzing the image 106 can further include a step 226 of using machine learning algorithms to enhance detection accuracy and identify special cards based on their unique characteristics.

It should be appreciated that the method 200 can include a step 228 of determining an authenticity of the card 101 based on an appearance of the card 101 in the image, as described herein. The method 200 can further include a step 230 of determining a condition of the card 101 and the sealed packaging 103 based on a presence of physical damage. The method 200 can include a step 232 of determining a grade of the card based on a measuring condition, as described herein.

With reference to FIGS. 8-12, the present disclosure further contemplates a system 300 for militating against a non-invasive identification of collectibles, such as cards 301 within sealed packages 303. The system 300 can include a sealed package 303 containing one or more cards 301. The sealed package 303 can include at least one of an artifact-inducing material 302 and a radiation detection mechanism 304. The system 300 can also include a motion-inducing component 306 within the sealed package 303.

With reference to FIGS. 8-10, the artifact-inducing material 302 can be integrated within the sealed package 303. The artifact-inducing material 302 can be configured to generate interference in interpreting a scan of the sealed package 303. An artifact-inducing material 302 can be a substance or structure intentionally incorporated into the sealed package 303 to disrupt or interfere with scanning techniques. The artifact-inducing material 302 can work by creating distortions, occlusions, shadows or misrepresentation shadows in the resulting scan, making it difficult to accurately identify or analyze the contents of the package. Examples of artifact-inducing materials 302 can include meshes like steel wool or copper mesh, which can be used to line the inside of the sealed package 303 or between sealed packages 303 in a box, as shown in FIG. 9a. It should be appreciated that even a small amount of the artifact-inducing material can cause artifacts, discouraging image 106 readability, as shown in FIGS. 9b and 10b.

The artifact-inducing material 302 disrupt the scan by exploiting various physical phenomena. Dense materials can cause beam hardening artifacts, which result in inconsistent attenuation of X-rays and distort the image 106. High-density materials can block or significantly reduce the number of X-ray photons reaching the detector 110, creating areas of poor image quality. Irregular shapes and dense materials can cause X-rays to scatter in unpredictable ways, introducing noise and distortion into the image 106. It should be appreciated that high atomic number plays an outsized impact, especially when imaging with low-energy X-rays.

With reference to FIG. 10a, the artifact-inducing material 302 can include irregular shapes of high density or high atomic number elements, such as containing tungsten, lead, bismuth, barium, copper, and iron. The effectiveness of these materials in disrupting scans, as shown in FIG. 10b, is due to the ability to create complex, nonlinear effects that are challenging to correct or compensate for in image reconstruction algorithms. The irregular shapes can include splotches, powders, grids, woolen or weaved fibers, stripes, sequins, or stars, as examples, which can be effective in causing scanning artifacts. The irregular shapes can cause numerous streaks, spots, voids, and nonlinear effects during the rotation of the X-ray source or object in a scan. For the sake of confounding detection of serialized cards, autographs, or other features containing text, regular patterns or numbers, the artifact-inducing material can be deployed in shapes that mimic these patterns; the effect can be analogous to erasing a handwritten note by writing over it with additional text, instead of crossing it out directly. An example is shown in FIG. 11. A skilled artisan can select a suitable high-density material and irregular shapes for causing scan disruption within the scope of the present disclosure.

In certain embodiments, the radiation detection mechanism 304 can be configured to indicate exposure to radiation above a predetermined threshold. The radiation detection mechanism 304 can serve as both a deterrent to unauthorized scanning and a means of alerting potential buyers to tampering attempts. The radiation detection mechanism 304 can utilize materials that undergo visible changes upon exposure to radiation. As an example, the radiation detection mechanism 304 can include photochromic substances and radiation-sensitive films. These materials change color or darken when exposed to radiation levels typical of industrial scans, but not lower-intensity environments such as airport security. A skilled artisan can select a suitable predetermined threshold of radiation within the scope of the present disclosure.

Advantageously, the radiation detection mechanism 304 can provide tamper evidence via a visible indicator of unauthorized scanning attempts. The radiation detection mechanism 304 also serves as a deterrent, as the presence of such a mechanism can discourage attempts at non-invasive identification using X-ray techniques. Additionally, the radiation detection mechanism 304 offers consumer protection by allowing potential buyers to verify if a package has been subjected to unauthorized scanning. The radiation detection mechanism 304 can cause a physical change to the card 101 in the sealed package 103, for instance, causing card 101 to change color or stick together, reducing the value of the card 101.

With respect to the placement of the radiation detection mechanism 304, the radiation detection mechanism 304 can be incorporated in several ways. As one example, the radiation detection mechanism 304 can be disposed inside the sealed package 303, potentially as part of a card or insert. Additionally, the radiation detection mechanism 304 can be disposed on the exterior of the sealed package 303 as a film. A skilled artisan can select a suitable size and location for the radiation detection mechanism within the scope of the present disclosure.

With reference to FIG. 12, the system 300 can also include a motion-inducing component 306 within the sealed package 303. The motion-inducing component 306 can be configured to allow a movement of the one or more cards 301 during scanning. Motion artifacts are known to be challenging for CT scanning, as motion creates blurring or halo effects that can degrade scan quality. Examples of motion-inducing components can include loose harnesses, springs, spring-loaded platforms, ball bearings, and cylindrical roller bearings. These components can be suspended within the sealed package 303 or support the sealed package 303 in a way that allows the motion-inducing component 306 and, by extension, the sealed package 303, to move during the scanning process. It should be appreciated that the motion-inducing component 306 can be passive, relying on the regular shifts during a scan to linearly or rotationally translate the sealed package 103 during scanning or acquisition of reference images. Alternatively, the motion-inducing component 306 can be active, using the X-rays to trigger or power directly a movement mechanism that causes the scanned object to shift during scanning.

It should be appreciated that the motion-inducing component 306 works to obscure the scan collected by the detector 110 by exploiting the sensitivity of the system 100 to movement. During a scan, any motion of the object being imaged can create artifacts that distort the image 106. In the case of cards 301, the motion can blur the fine details that are required for identification and authentication, such as card text, artwork, or special features like holographic elements. The unpredictable nature of the motion induced by the motion-inducing component 306 makes it challenging for scanning systems to compensate for or correct these artifacts.

In certain embodiments, the composition of the cards 301 can be altered to reduce the detectability of the card 301 in scans, such as CT or X-ray scans, for example. By adjusting the physical makeup of the cards, standard scanning techniques can be less effective. In a particular embodiment, the use of organic inks instead of inks containing dense elements can result in reduced contrast in the resulting image 106. For example, POKEMON® cards are detectable with X-ray CT due to the use of inks containing dense elements. Organic inks, on the other hand, are much more difficult to differentiate from the rest of the card, especially if there is no raised or textured morphology and are preferred when militating against a non-invasive identification of cards 301.

In certain embodiments, the physical features of cards 301 can be altered to minimize features that easily identifiable in scans. For example, reverse-holographic foil cards in vintage POKEMON® sets are slightly raised relative to the rest of the card, making them more easily identifiable after scanning. By removing the distinctive physical characteristics, the cards 301 can become less conspicuous in X-ray or CT scans. Additionally, the placement of special cards 301 have historically been consistent in sealed packages 303 such that collectors know, for example, that should a special card be present in the sealed package, the special card 301 will be placed fourth in the sealed package 303 relative to the other cards 301 in the package. By randomizing the position and orientation of special cards 301 within sealed packages 303, automated scanning efforts can be more challenging.

The present disclosure can further provide a method 400 for discouraging identification of a collectible, such as a card 301, within a sealed package 303, as shown in FIG. 13. The method 400 can include a step 402 of providing a sealed package 303 including one or more cards 301. The method 400 can include at least one of a step 404 of integrating an artifact-inducing material 302 with the sealed package 303, a step 406 of associating a radiation detection mechanism 304 with the sealed package 303 and a step 408 of incorporating a motion-inducing component 306 with the sealed package 303. As described herein, the artifact-inducing material 302 can be configured to generate an artifact in a scan of the sealed package 303. The radiation detection mechanism 304 can be configured to indicate an exposure to radiation above the predetermined threshold. The motion-inducing component 306 can be configured to allow a movement of the one or more cards 301 during scanning.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodi-

What is claimed is:

1. A system for non-invasive identification of a card within a sealed package, comprising:
   a scanning source including
      an emitter configured to emit an electromagnetic radiation, and
      a detector configured to capture an image of an internal content of the sealed package containing the card; and
   a computing device in communication with the scanning source and configured to:
      receive the image captured by the detector;
      analyze the image to provide a layer image of the card representing the card within the sealed package,
      apply a virtual flattening technique to the layer image to provide a virtually flattened image,
      apply a contrast enhancement to the virtually flattened image to provide an enhanced image that improves an identification of an image and a text of the card within the sealed package, and
      determine an identity of the card based on the image and the text of the card within the sealed package.

2. The system of claim 1, wherein the computing device is further configured to at least one determine an authenticity of the card based on an appearance of the card in the image, determine a condition of the card and the sealed packaging based on a presence of physical damage, and determine a grade of the card based on a measuring condition.

3. The system of claim 1, wherein the computing device is further configured to identify presence of a predetermined card by detecting at least one of a physical texture, a metallic or dense ink, a foil or a plastic backing that differentiates the card.

4. The system of claim 1, wherein the computing device is configured to apply beam hardening correction to reduce greyscale variation artifacts.

5. The system of claim 1, wherein the computing device is further configured to perform computed tomography (CT) to obtain a three-dimensional image of the sealed package contents.

6. The system of claim 1, further comprising a tilting mechanism configured to tilt the sealed package to minimize path length and maximize signal-to-noise ratio during scanning.

7. The system of claim 1, wherein the sealed packages of card includes at least one of Pokémon® cards, Magic: The Gathering® cards, and sports cards.

8. A method for non-invasive identification of a card within a sealed package with a scanning source, comprising:
   scanning the sealed package to capture an image of an internal content of the sealed package including the card; and
   analyzing the image to determine an identity of the card within the sealed package.

9. The method of claim 8, further comprising steps of:
   applying a virtual flattening technique to improve a visualization of the captured image of the internal content of the sealed package, whereby a virtually flattened image is formed; and
   applying a contrast enhancement to the virtually flattened image.

10. The method of claim 8, further comprising steps of:
    determining an authenticity of the card based on an appearance of the card in the image;
    determining a condition of the card and the sealed packaging based on a presence of physical damage; and
    determining a grade of the card based on a measuring condition.

11. The method of claim 8, wherein analyzing the captured image comprises identifying presence of a special card by detecting a physical texture, metallic or dense ink, or foil or plastic backing that differentiates the card.

12. The method of claim 8, further comprising performing computed tomography (CT) to obtain a three-dimensional image of the sealed package contents.

13. The method of claim 12, further comprising applying beam hardening correction to reduce greyscale variation artifacts.

14. The method of claim 9, further comprising tilting the sealed package for a corner scan to minimize path length and maximize signal-to-noise ratio during scanning.

15. The method of claim 9, further comprising using machine learning algorithms to enhance detection accuracy and identify special cards based on their unique characteristics.

16. A system for militating against a non-invasive identification of a collectible within a sealed package, comprising:
    a sealed package containing the collectible, the sealed package including a member selected from a group consisting of:
       an artifact-inducing material configured to generate an artifact in a scan of the sealed package;
       a radiation detection mechanism configured to indicate an exposure to radiation above a predetermined threshold;
       a motion-inducing component configured to allow a movement of the collectible during a scan of the sealed package; and
       combinations thereof.

17. The system of claim 16, wherein the artifact-inducing material includes at least one of an attenuating material and a shape, the artifact-inducing material resulting in an artifact distortion, occlusion, shadow, or misrepresentation.

18. The system of claim 16, wherein the radiation detection mechanism includes at least one of a photochromic substance and a radiation-sensitive film.

19. The system of claim 16, wherein the radiation detection mechanism includes a radiation-sensitive material integrated with the collectible, the radiation-sensitive material configured to indicate a change when exposed to radiation above a predetermined threshold.

20. A method for discouraging identification of a collectible within a sealed package, comprising:
    forming the sealed package about the collectible, the sealed package including a member selected from a group consisting of:
       an artifact-inducing material configured to generate an artifact in a scan of the sealed package;
       a radiation detection mechanism configured to indicate an exposure to radiation above a predetermined threshold;
       a motion-inducing component configured to allow a movement of the collectible during scanning; and
       combinations thereof.

* * * * *